United States Patent
Takahashi et al.

(10) Patent No.: US 9,477,187 B2
(45) Date of Patent: Oct. 25, 2016

(54) TEMPERATURE-MEASURING DEVICE THAT MEASURES TEMPERATURE OF SHEET, AND IMAGE-FORMING APPARATUS USING THE SAME

(71) Applicant: Konica Minolta, Inc., Tokyo (JP)

(72) Inventors: Katsunori Takahashi, Tokyo (JP); Kenichi Hayashi, Tokyo (JP); Takashi Nara, Saitama (JP); Tatsuhiro Noutomi, Tokyo (JP); Hiroyuki Futami, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/040,455

(22) Filed: Feb. 10, 2016

(65) Prior Publication Data

US 2016/0231670 A1    Aug. 11, 2016

(30) Foreign Application Priority Data

Feb. 10, 2015  (JP) ................ 2015-023975

(51) Int. Cl.
    *G03G 15/00*    (2006.01)
    *G03G 15/20*    (2006.01)
    *G01J 5/02*     (2006.01)

(52) U.S. Cl.
    CPC ............. *G03G 15/2039* (2013.01); *G01J 5/02* (2013.01)

(58) Field of Classification Search
    CPC .................................................. G03G 15/02
    USPC ........................................ 399/39, 41, 44, 49
    See application file for complete search history.

(56) References Cited

U.S. PATENT DOCUMENTS

| 8,886,066 B2* | 11/2014 | Matsumoto ........ G03G 15/0131 399/228 |
| 8,995,892 B2* | 3/2015 | Sato ....................... G03G 15/50 399/301 |
| 2007/0065165 A1* | 3/2007 | Mashiba ............ G03G 15/2039 399/33 |
| 2011/0002702 A1* | 1/2011 | Niijima .................. G03G 15/50 399/44 |

FOREIGN PATENT DOCUMENTS

| JP | H07-324981 A | 12/1995 |
| JP | 2004-157009 A | 6/2004 |

* cited by examiner

*Primary Examiner* — Walter L Lindsay, Jr.
*Assistant Examiner* — Jessica L Eley
(74) *Attorney, Agent, or Firm* — Osha Liang LLP (57) ABSTRACT

An image-forming apparatus contains a control portion, a thermopile sensor, a temperature sensor, a fan, a heater, a guide plate temperature detection sensor, an external air temperature detection sensor, a fixing temperature detection sensor and the color sensor. The control portion calculates estimated sheet temperature of the conveying sheet using information such as guide plate temperature, external air temperature, fixing temperature and paper weight. The control portion controls the fan or the heater to drive so that sensor temperature of the thermopile sensor approaches the estimated sheet temperature of the sheet. The control portion controls the thermopile sensor to carry out a measurement of the temperature of the sheet when the sensor temperature falls within a set range in relation to the estimated sheet temperature.

5 Claims, 5 Drawing Sheets

FIG. 1

Related Art

TEMPERATURE-MEASURING DEVICE THAT MEASURES TEMPERATURE OF SHEET, AND IMAGE-FORMING APPARATUS USING THE SAME

CROSS REFERENCES TO RELATED APPLICATIONS

The present invention contains subject matter related to Japanese Patent Application JP 2015-023975 filed in the Japanese Patent Office on Feb. 10, 2015, the entire contents of which being incorporated herein by reference.

BACKGROUND

1. Technical Field

The present invention relates to a temperature-measuring device that measures temperature of a sheet and an image-forming apparatus that uses such a temperature-measuring device.

2. Background Art

An image-forming apparatus adopting an electrophotographic system such as a printer, a copier, a facsimile or the like has been widely utilized in the past. In the image-forming apparatus, there may be variations in environmental conditions such as temperature, humidity or the like and any deterioration of photoreceptor, developing material or the like with time, namely, a variation in concentration of image and/or printing position based on the durability deterioration. Therefore, the image-forming apparatus may fail to form an image stably. Accordingly, the image-forming apparatus contains a color sensor provided on a downstream side of a fixing device. The color sensor has detected patches for image adjustment formed on a sheet. This detection result has been fed back to an image-forming condition such as exposure, charge, development bias or the like so that a control for stabilizing the image (image-stabilizing control) can be performed.

However, in a past image-stabilizing control, the color sensor detects the patches formed on a sheet passed through the fixing device. In this case, thermochromism phenomenon may occur by changing temperature of the sheet or the patches by heating of the fixing device, thereby shifting color measurement values of the patches to be measured by the color sensor from a correct color measurement value thereof. Here, the thermochromism phenomenon is referred to as a phenomenon in which a color of a toner image becomes changed by changing a chemical bond of the elements in toner materials by heating.

In view of the above, a control has been performed in which an infrared radiation temperature measurement sensor such as a thermopile sensor measures temperature of a sheet and color measurement values of the patches for image adjustment are corrected on the basis of the sheet temperature acquired by this measurement. According to this control, it has been possible to perform any correct color measurement independent of any temperature of the sheet. Therefore, in the above control, the correct measurement of the temperature of the sheet P has been important. For example, Japanese Patent Application Publication No. 2004-157009 discloses a radiation temperature measurement method that is capable of measuring temperature, without being directly influenced by the variations and changes in the sensitivity of a thermal radiation sensor. Japanese Patent Application Publication No. H07-324981 discloses a radiation thermometer that is capable of improving efficiency of setting operation of radiation when measuring temperature.

A past infrared radiation temperature measurement sensor disclosed in Japanese Patent Application Publication No. 2004-157009 or Japanese Patent Application Publication No. H07-324981 has the following characteristics.

Figure 1:
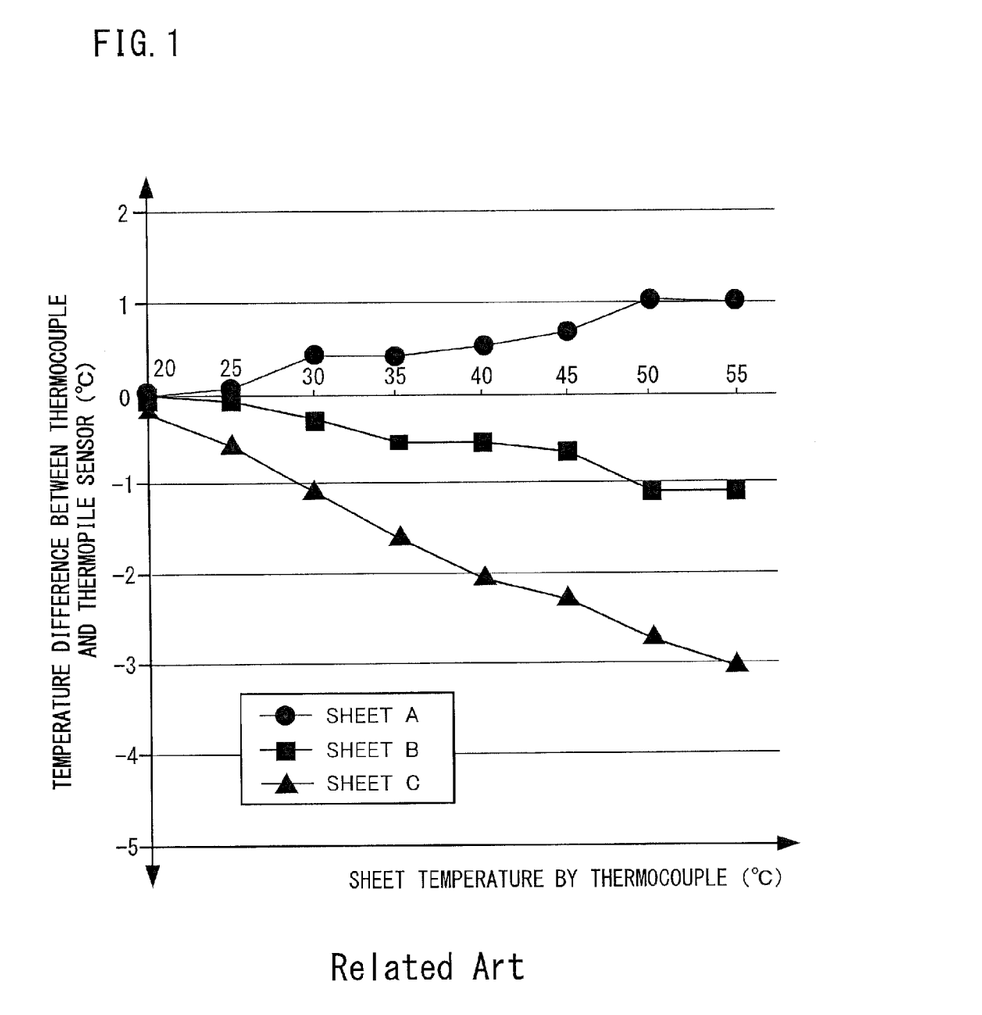
FIG. 1 is a diagram showing characteristics of a thermopile sensor.

FIG. 1 shows characteristics of a thermopile sensor as the infrared radiation temperature measurement sensor. A horizontal axis thereof indicates a sheet temperature measured by the thermocouple of contact type and a vertical axis thereof indicates a difference between the sheet temperature measured by the thermocouple of contact type and the sheet temperature measured by the thermopile sensor of contactless type (hereinafter, referred to as "temperature difference between the thermocouple and the thermopile sensor"). It is to be noted that sheets A, B and C have different paper weights and different surface characteristics. As shown in FIG. 1, when the sheet temperature measured by the thermocouple is 55 degrees C., the temperature differences between the thermocouple and the thermopile sensor are about +1 degree C. in the sheet A, about −1 degree C. in the sheet B and about −3 degrees C. in the sheet C. For example, it is known that when the sheet temperature is shifted by 4.9 degrees C., the color measurement value is shifted to $\Delta E76=1.00$.

Thus, when measuring the sheet temperature using the thermopile sensor of contactless type, this sheet temperature may be very different from the temperature measured by the thermocouple because radiations differ for every species of sheet. Accordingly, there may be a case that is insufficient to meet a condition of temperature difference (for example, ±3 degrees C.) between the thermocouple and the thermopile sensor, which is required as a precision of the color measurement value. It is conceivable to correct the radiation according to the species of sheets to be measured as the past. There, however, are enormous species of sheets in a modern market and it is difficult in a realistic manner to correct the radiation for every species of sheet. Further, it is difficult to measure the sheet temperature in the precision required for any correction of the thermochromism phenomenon.

SUMMARY OF THE INVENTION

One or more embodiments of the present invention provide a temperature-measuring device that is capable of easily and accurately measuring sheet temperature even when measuring temperature of the sheets of different species using a radiation temperature sensor, and an image-forming apparatus that uses such a temperature-measuring device.

In one or more embodiments, an image-forming apparatus contains an image-forming portion that forms a patch for image adjustment on a sheet, a fixing portion that fixes the patch formed on the sheet by the image-forming portion, a color sensor that measures a color of the patch on the sheet fixed by the fixing portion to acquire a color measurement value, a radiation temperature sensor that temperature of the sheet passed through the fixing portion by a contactless state, a temperature sensor that measures temperature of the radiation temperature sensor, a temperature adjustment portion that adjusts temperature of the radiation temperature sensor, and a control portion that estimates the temperature of the sheet based on an image-forming condition when forming the image, and controls the temperature adjustment portion so that the temperature of the radiation temperature sensor measured by the temperature sensor approaches the estimated temperature of the sheet, wherein the control portion acquires the temperature of the sheet measured by the radiation temperature sensor when the temperature of the sheet measured by the radiation temperature sensor is within a predetermined range thereof in relation to the estimated temperature of the sheet and corrects the color measurement value measured by the color sensor based on the acquired temperature of the sheet.

According to one or more embodiments of the present invention, the image-forming condition includes at least one of external air temperature, temperature of the fixing portion, temperature of a guide plate that guides the sheet to a conveying direction of the sheet and paper weight of the sheet.

Further, in one or more embodiments, the temperature adjustment portion includes at least one of a fan and a heater.

In one or more embodiments, a temperature-measuring device contains a radiation temperature sensor that measures temperature of a sheet by a contactless state, a temperature sensor that measures temperature of the radiation temperature sensor, a temperature adjustment portion that adjusts temperature of the radiation temperature sensor, and a control portion that estimates the temperature of the sheet based on an image-forming condition when forming the image, and controls the temperature adjustment portion so that the temperature of the radiation temperature sensor measured by the temperature sensor approaches the estimated temperature of the sheet, wherein the control portion acquires the temperature of the sheet measured by the radiation temperature sensor when the temperature of the sheet measured by the radiation temperature sensor is within a predetermined range thereof in relation to the estimated temperature of the sheet.

Other aspects, features, and characteristics of embodiments of the present invention will be become apparent to those skilled in the art upon a reading of the following detailed description when taken in conjunction with the drawing.

DESCRIPTION OF EMBODIMENTS

The following will describe embodiments of a sheet-conveying device and an image forming system using the same with reference to the drawings. Such description does not limit the technical scope, meaning of terms and the like in Claims. Size and/or ratio in the drawings are exaggerated for convenience of explanation and they may be different from real ones.

<Configuration Example of Image-Forming Apparatus 100 According to Embodiment of Invention>

Figure 2:
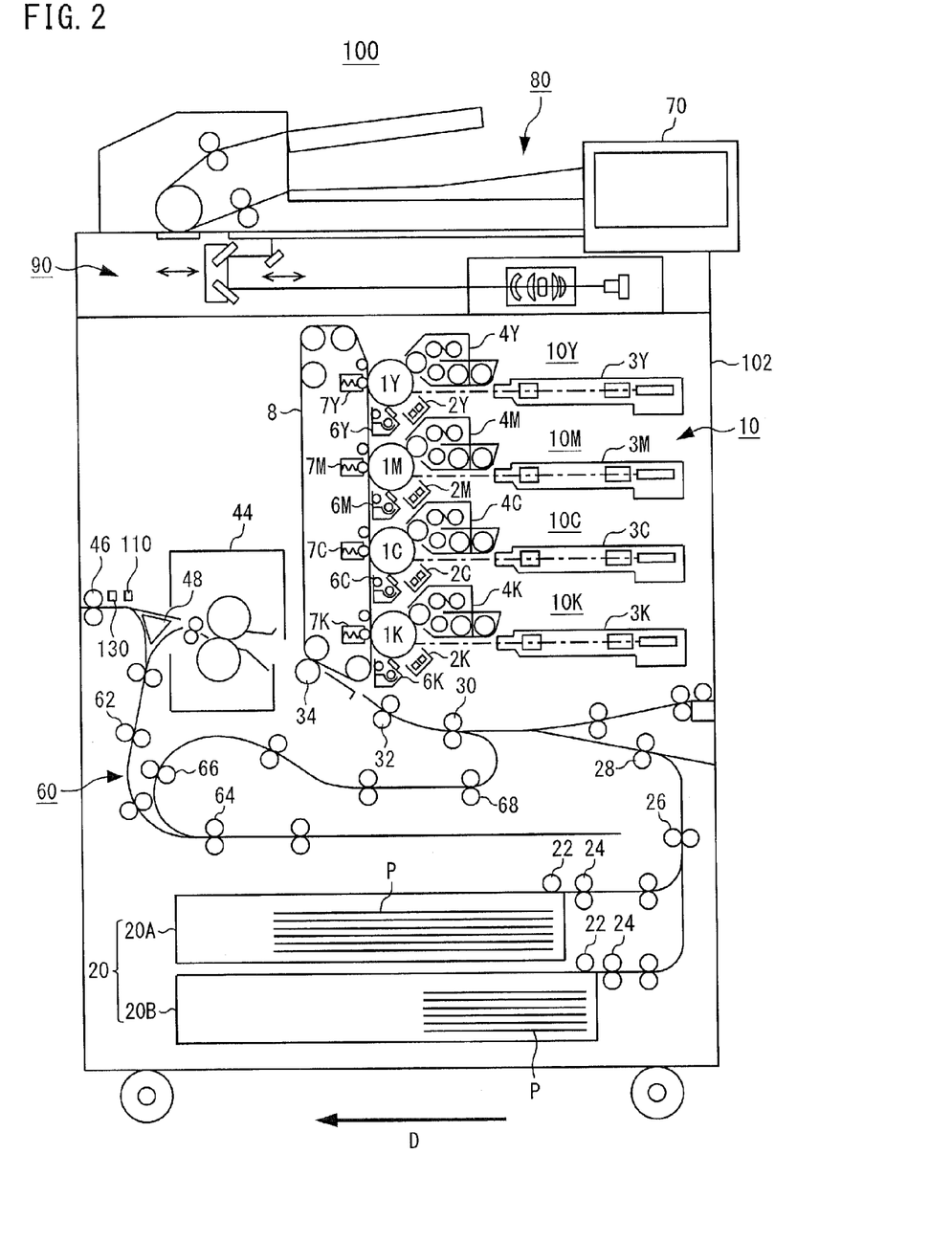
FIG. 2 is a diagram showing a configuration example of an image-forming apparatus according to one or more embodiments of the present invention.

FIG. 2 schematically shows an image-forming apparatus 100 according to an embodiment of the invention. As shown in FIG. 2, the image-forming apparatus 100 is a so-called color image-forming apparatus of a tandem type. The image-forming apparatus 100 is provided with an automatic document feeder 80 and an apparatus main body 102. The automatic document feeder 80 is mounted on the apparatus main body 102. The automatic document feeder 80 feeds the document(s) set on a feeding table to an image-reading portion 90 of the apparatus main body 102 using transfer rollers and the like.

The apparatus main body 102 contains a manipulation/display portion 70, the image-reading portion 90, an image-forming portion 10, an intermediate transfer belt 8, a feeder 20, registration rollers 32, a fixing portion 44, a thermopile sensor 110, a color sensor 130 and an auto duplex unit (ADU) 60.

The manipulation/display portion 70 is installed on the apparatus main body 102. The manipulation/display portion 70 contains a touch panel combining a display device such as a liquid crystal panel or the like with a position input device, and plural manipulation keys including numeric keys, a determination key and the like. The manipulation/display portion 70 displays a manipulation screen and receives any image-forming conditions such as species of sheet and paper weight of the sheet, which a user inputs using the manipulation screen and/or through the manipulation keys.

The image-reading portion 90 scans and exposes an image on the document mounted on the document table or fed by the automatic document feeder 80 using an optical system of a scanning and exposing device. The image-reading portion 90 also performs photoelectric conversion on the scanned image of the document by a charge couple device (CCD) image sensor to obtain an image information signal. An image-processing portion, not shown, performs analog processing, analog/digital (A/D) conversion processing, shading processing, image compression processing and like on the image information signal to output the processed signal to the image-forming portion 10.

The image-forming portion 10 forms the image according to the electrophotographic system. The image-forming portion 10 includes an image-forming unit 10Y which forms a yellow (Y) image, an image-forming unit 10M which forms a magenta (M) image, an image-forming unit 10O which forms a cyan (C) image and an image-forming unit 10K which forms a black (K) image. In this embodiment, respective common function names are represented by Y, M, C and K indicating respective colors to be formed following, for example, the numeral 10.

The image-forming unit 10Y contains a photosensitive drum 1Y, a charging portion 2Y positioned around the photosensitive drum 1Y, an exposing portion 3Y, a developing portion 4Y and a drum cleaner 6Y. Similarly, the image-forming unit 10M contains a photosensitive drum 1M, a charging portion 2M positioned around the photosensitive drum 1M, an exposing portion 3M, a developing portion 4M and a drum cleaner 6M. The image-forming unit 10O contains a photosensitive drum 1O, a charging portion 2C positioned around the photosensitive drum 1O, an exposing portion 3C, a developing portion 4C and a drum cleaner 6O. The image-forming unit 10K contains a photosensitive drum 1K, a charging portion 2K positioned around the photosensitive drum 1K, an exposing portion 3K, a developing portion 4K and a drum cleaner 6K.

The photosensitive drum 1Y, 1M, 1O and 1K, the charging portion 2Y, 2M, 2C and 2K, the exposing portion 3Y, 3M, 3C and 3K, the developing portion 4Y, 4M, 4C and 4K and the drum cleaner 6Y, 6M, 6C and 6K in the image-forming unit 10Y, 10M, 10O and 10K respectively have the common configurations. Accordingly, the following will describe them without indicating Y, M, C and K, unless their distinctions require.

The charging portion 2 charges a static charge uniformly around the surface of the photosensitive drum 1. The exposing portion 3 is composed of, for example, an LED print head (LPH) including an LED array and imaging lenses or a laser exposure and scanning device of polygon mirror system. The exposing portion 3 scans and exposes a surface of the photosensitive drum 1 by laser light based on the image information signal to form an electrostatic latent image on the photosensitive drum 1. The developing portion 4 develops the electrostatic latent image formed on the surface of the photosensitive drum 1 by using toner. Accordingly, a visible toner image is formed on the photosensitive drum 1.

In this embodiment, the image-forming portion 10 forms the patches for image adjustment on the sheet P to perform the image-stabilizing control. The patches are configured so as to be a group of plural patches which are aligned on a straight line for every color, Y, M, C or K. The patches of each color gradate along a sheet-conveying direction D from light color to deep color or vice versa in order.

The intermediate transfer belt 8 is stretched from plural primary rollers 7 and the like and is rotatably supported by them. The primary transfer rollers 7 and the photosensitive drum 1 rotate accompanying with the rotation of the intermediate transfer belt 8. By applying a predetermined voltage across the primary transfer rollers 7 and the photosensitive drum 1, the toner image formed on the photosensitive drum 1 is transferred onto the intermediate transfer belt 8 (Primary Transfer).

The feeder 20 contains plural feeding trays 20A, 20B and the like, each tray storing the sheets P such as sheets of A3 size or A4 size. Rollers 22, 24, 26, 28 and the like convey the sheet P from each of the feeding trays 20A and 20B to the registration rollers 32. Numbers of the feeding trays are not limited to two. Further, if necessary, single or plural large capacity sheet feeding apparatuses which can store a large number of sheets may be connected to this image-forming apparatus.

The registration rollers 32 correct any skew or deviation of the sheet and then, convey the corrected sheet P to the secondary transfer rollers 34 at a predetermined timing. The secondary transfer rollers 34 transfer each color toner image of Y, M, C or K overlapped and transferred onto the intermediate transfer belt 8 to the conveying sheet P in a lump (Secondary Transfer). The secondary transfer rollers 34 convey the sheet P on which the secondary transfer is performed to the fixing portion 44, which is arranged at a downstream side of the secondary transfer rollers 34, along the sheet conveying direction D.

The fixing portion 44 is provided with a pair of pressure rollers, a pair of fixing rollers and the like. The fixing portion 44 performs pressure and heat processing on the sheet P, to which the secondary transfer rollers 34 have transferred the toner images, to fix the toner images formed on the sheet P.

The thermopile sensor 110 is arranged at a downstream side of the fixing portion 44 along the sheet conveying direction D. The thermopile sensor 110 measures temperature of the sheet P passed through the fixing portion 44. The color sensor 130 is arranged at a downstream side of the thermopile sensor 110 along the sheet conveying direction D. The color sensor 130 measures each color of the patches for image adjustment formed on the sheet P to acquire a color measurement value. The thermopile sensor 110 and the color sensor 130 will be described later.

A change-over gate 48 for changing over the conveying route of the sheet P to a sheet-ejection side or a side of ADU 60 is arranged at a downstream side of the fixing portion 44 along the sheet conveying direction D. The change-over gate 48 performs a changing-over control of conveying route based on a selected printing mode (one-side printing mode, duplex printing mode or reverse printing mode).

The sheet P, one surface of which is printed in the one-side printing mode or both surfaces of which are printed in the duplex printing mode or the reverse printing mode, is ejected to a sheet-ejection tray, not shown. Further, when the image is formed on the reverse surface of the sheet P in the duplex printing mode or the reverse printing mode, transfer rollers 62 and the like convey the sheet P in which an image has been already formed on the surface thereof to ADU 60. In a switchback route of ADU 60, reverse rotation of ADU rollers 64 enables the sheet P to be conveyed to a U-turn transfer route with a rear end of the sheet P going ahead. Transfer rollers 66, 68 and the like provided on the U-turn transfer route convey the sheet P again to the secondary transfer rollers 34 with the sheet P being reversed.

<Characteristics of Thermopile Sensor>

The following will describe characteristics of the thermopile sensor 110 with reference to FIG. 1. In the following case, it is assumed that the temperature of the thermopile sensor 110 is, for example, 20 degrees C. It is to be noted that the temperature of the thermopile sensor 110 changes according to ambient temperature.

As shown in FIG. 1, when the temperature of the sheet P measured by the thermocouple of contact type is 20 degrees C., a temperature difference between the temperature of the sheet A measured by the thermocouple of contact type and the temperature of the sheet A measured by the thermopile sensor 110 of contactless type (hereinafter, referred to as "temperature difference between the thermocouple and the thermopile sensor 110") is about +0.3 degrees C. The temperature difference between the thermocouple and the thermopile sensor 110 relating to the sheet B is about −0.2 degrees C. The temperature difference between the thermocouple and the thermopile sensor 110 relating to the sheet C is about +0.3 degrees C. Therefore, the temperature difference between the thermocouple and the thermopile sensor 110 relating to the sheets A, B and C does not exceed ±0.3 degrees C.

On the other hand, as shown in FIG. 1, when the temperature of the sheet P measured by the thermocouple of contact type is 55 degrees C., the temperature difference between the thermocouple and the thermopile sensor 110 relating to the sheet A is about +1 degree C. The temperature difference between the thermocouple and the thermopile sensor 110 relating to the sheet B is about −1 degree C. The temperature difference between the thermocouple and the thermopile sensor 110 relating to the sheet C is about −3 degrees C. Therefore, the temperature difference between the thermocouple and the thermopile sensor 110 relating to the sheets A, B and C does not exceed about −3 degrees C.

Thus, when a difference between the temperature of the thermopile sensor 110 and the sheet temperature is large, it is understood that the thermal emissivity based on a difference in species of sheet has a significant influence. However, when a difference between the temperature of the thermopile sensor 110 and the sheet temperature is small or the temperature of the thermopile sensor 110 is equal to the sheet temperature, it is understood that the thermal emissivity based on a difference in species of sheet has any little influence. Accordingly, in this invention, the temperature of the sheet P heated by the fixing portion 44 is estimated and a control is performed so that the temperature of the thermopile sensor 110 approaches the estimated sheet temperature, thereby accurately measuring the temperature of the sheet P without receiving any influence of the thermal emissivity based on the difference in the species of sheet.

<Function Example of Image-Forming Apparatus 100>

Figure 3:
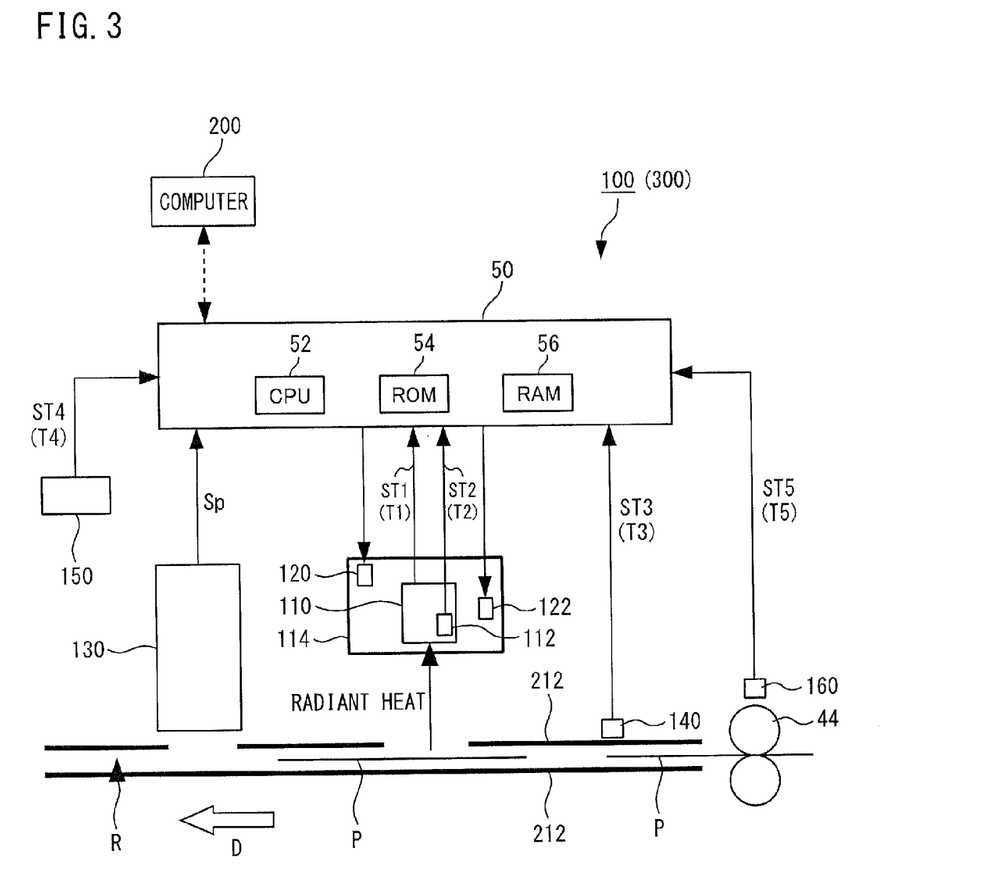
FIG. 3 is a block diagram showing a functional configuration example of the image-forming apparatus.

FIG. 3 shows a function example of the image-forming apparatus 100 according to an embodiment of the invention. As shown in FIG. 3, the image-forming apparatus 100 includes a control portion 50, the thermopile sensor 110, a temperature sensor 112, a fan 120, a heater 122, a guide plate temperature detection sensor 140, an external air temperature detection sensor 150, a fixing temperature detection sensor 160 and the color sensor 130. The thermopile sensor 110, the temperature sensor 112, the fan 120, the heater 122, the guide plate temperature detection sensor 140, the external air temperature detection sensor 150, the fixing temperature detection sensor 160 and the color sensor 130 are respectively connected to the control portion 50.

The thermopile sensor 110 is an example of a radiation temperature sensor and is arranged over a conveying route R between the fixing portion 44 and the color sensor 130. The thermopile sensor 110 is positioned inside a case 114 in order to effectively perform temperature adjustment on the thermopile sensor 110. The thermopile sensor 110 can measure temperature of the sheet P passed through the fixing portion 44 in a contactless state. In one or more embodiments, the contactless state of measuring is described as "contactlessly measuring" or measuring the temperature of the sheet without contacting the actual sheet. The thermopile sensor 110 detects radiant heat (infrared radiation) emitted from the sheet P heated by the fixing portion 44 to measure the temperature T1 of the sheet P (hereinafter, referred to as "sheet temperature T1"). The thermopile sensor 110 supplies temperature information ST1 concerning the measured temperature of the sheet P to the control portion 50. The temperature information ST1 is used when correcting the color measurement value of the patches for image adjustment. In this embodiment, a guide plate 212 has an opening at a position opposite to the thermopile sensor 110 and the radiant heat radiates from the sheet P through the opening. Further, the case 114 may have an opening at a lower side thereof opposite to the thermopile sensor 110.

The temperature sensor 112 is composed of, for example, a thermistor and is included in the thermopile sensor 110. The temperature sensor 112 measures temperature T2 of the thermopile sensor 110 (hereinafter, referred to as "sensor temperature T2") and supplies to the control portion 50 temperature information ST2 concerning the temperature of the thermopile sensor 110. The temperature information ST2 is used when estimating the temperature of the sheet P. The temperature sensor 112 may be provided near (around) the thermopile sensor 110, not included in the thermopile sensor 110.

The fan 120 is provided inside the case 114 and around the thermopile sensor 110. The fan 120 drives based on a driving signal received from the control portion 50 to cool the thermopile sensor 110 by applying wind to the thermopile sensor 110. For example, the fan 120 is used when the sensor temperature T2 of the thermopile sensor 110 is higher than the estimated temperature of the sheet P, which will be described later. The fan 120 may be used when circulating the air in the case 114. This fan constitutes a temperature adjustment portion.

The heater 122 is provided inside the case 114 and around the thermopile sensor 110. The heater 122 drives based on a driving signal received from the control portion 50 to heat the thermopile sensor 110. For example, the heater 122 is used when the sensor temperature T2 of the thermopile sensor 110 is lower than the estimated temperature of the sheet P, which will be described later. This heater constitutes the temperature adjustment portion. The temperature adjustment portion adjusts the temperature of the thermopile sensor 110, which is a radiation temperature sensor.

The guide plate temperature detection sensor 140 is composed of, for example, a thermistor and is installed on a surface of a guide plate 212 which is provided at a downstream side of the fixing portion 44 along the sheet conveying direction D. The guide plate temperature detection sensor 140 measures temperature T3 of the guide plate 212 (hereinafter, referred to as "guide plate temperature T3") and supplies to the control portion 50 temperature information ST3 concerning the temperature of the guide plate 212. The temperature information ST3 is used when estimating the temperature of the sheet P.

The external air temperature detection sensor 150 is composed of, for example, a thermistor and measures external air temperature T4 to supply external air temperature information ST4 concerning the external air temperature to the control portion 50. The external air temperature detection sensor 150 may be provided inside or outside the image-forming apparatus 100. The external air temperature information ST4 is used when estimating the temperature of the sheet P.

The fixing temperature detection sensor 160 is composed of, for example, a thermistor and is provided around the fixing portion 44. The fixing temperature detection sensor 160 measures temperature T5 around the fixing portion 44 (hereinafter, referred to as "fixing temperature T5") and supplies temperature information ST5 concerning the temperature around the fixing portion 44. The temperature information ST5 is used when estimating the temperature of the sheet P.

The color sensor 130 is provided at a downstream side of the thermopile sensor 110 along the sheet conveying direction D. The color sensor 130 is composed of a light-emitting part, a light-receiving part (for example, a line sensor) and the like. The color sensor 130 measures colors of the respective patches for image adjustment, which have been formed on the sheet P, to acquire color measurement values. The color sensor 130 also supplies color measurement value information Sp concerning the acquired color measurement values to the control portion 50.

The control portion 50 includes a central processing unit (CPU) 52, a read only memory (ROM) 54 and a random access memory (RAM) 56. CPU 52 carries out any software (programs) read out of ROM 54 and the like to control every portion of the image-forming apparatus 100. CPU 52 conducts temperature adjustment control of the thermopile sensor 110 and any function relating to an image-forming process including the image-stabilizing control or the like.

The control portion 50 acquires paper weight Ptype of the sheet P on which the image is formed, in addition to the pieces of the temperature information ST3, ST4 and ST5, in the temperature adjustment control. The control portion 50 estimates the temperature of the sheet P (hereinafter, referred to as "estimated sheet temperature T6") based on these acquired pieces of the information. The paper weight Ptype is acquired through the manipulation/display portion 70 (see FIG. 2) or from a job sent by a computer 200 which is connected to the image-forming apparatus 100 via a network.

<Relationship Among Sheet Temperature T1, Fixing Temperature T5 and the Like>

Figure 4:
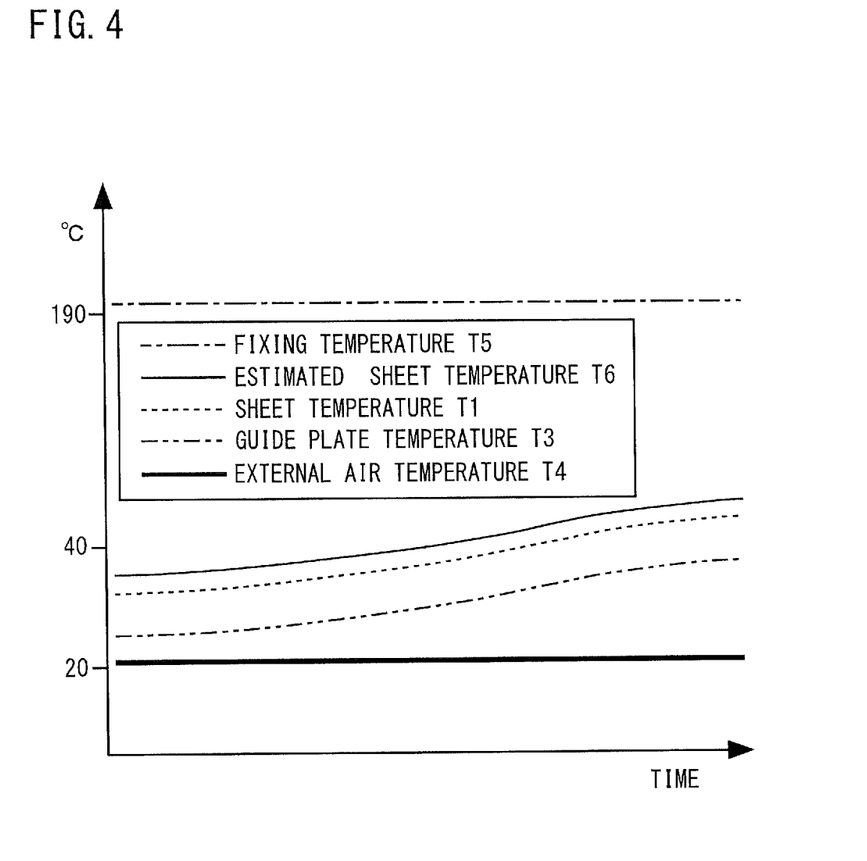
FIG. 4 is a graph showing relationships between any of external air temperature, fixing temperature and guide plate temperature and real sheet temperature.

FIG. 4 shows relationships between any of the guide plate temperature T3, the external air temperature T4 and the fixing temperature T5 and the real sheet temperature T1. In FIG. 4, a horizontal axis indicates time and a vertical axis indicates temperature. Ad shown in FIG. 4, when a job starts and the fixing portion 44 completes its warm-up operation, the fixing temperature T5 keeps at higher temperature. On the other hand, since the guide plate 212 is not yet warmed, the guide plate temperature T3 and the real sheet temperature T1 remains low temperature. When a fixed period of time elapses since the job starts, the guide plate 212 is warmed by heat of the fixing portion 44, so that the guide plate temperature T3 is increased and the real sheet temperature T1 is also increased accompanying with the increase of the guide plate temperature T3. Although a case where the external air temperature T4 keeps at a fixed temperature has been shown in FIG. 4, the sheet temperature T1 of the sheet P varies when the external air temperature T4 varies.

Moreover, the paper weight Ptype of the sheet P may influence the sheet temperature T1, which is not shown in FIG. 4. This is because if the paper weight Ptype of the sheet P is increased, the amount of heat kept in the sheet P is also increased, so that the sheet temperature T1 is increased. Thus, it is understood that the sheet temperature T1 is very influenced by the image-forming conditions such as the guide plate temperature T3, the external air temperature T4, the fixing temperature T5, the paper weight Ptype and the like. Accordingly, in this embodiment, the estimated sheet temperature T6 of the sheet P is calculated using each piece of the information concerning the guide plate temperature T3, the external air temperature T4, the fixing temperature T5 and the paper weight Ptype. The estimated sheet temperature T6 has a precision of ±5 degrees C. in relation to the real sheet temperature T1. Additionally, the guide plate temperature T3 may be indirectly estimated from the external air temperature T4 and/or the fixing temperature T5. Therefore, it may be possible to calculate the estimated sheet temperature T6 based on three species of the image forming conditions, namely, the external air temperature T4, the fixing temperature T5 and the paper weight Ptype.

<Operation Example of Image-Forming Apparatus 100 According to Embodiment of Invention>

Figure 5:
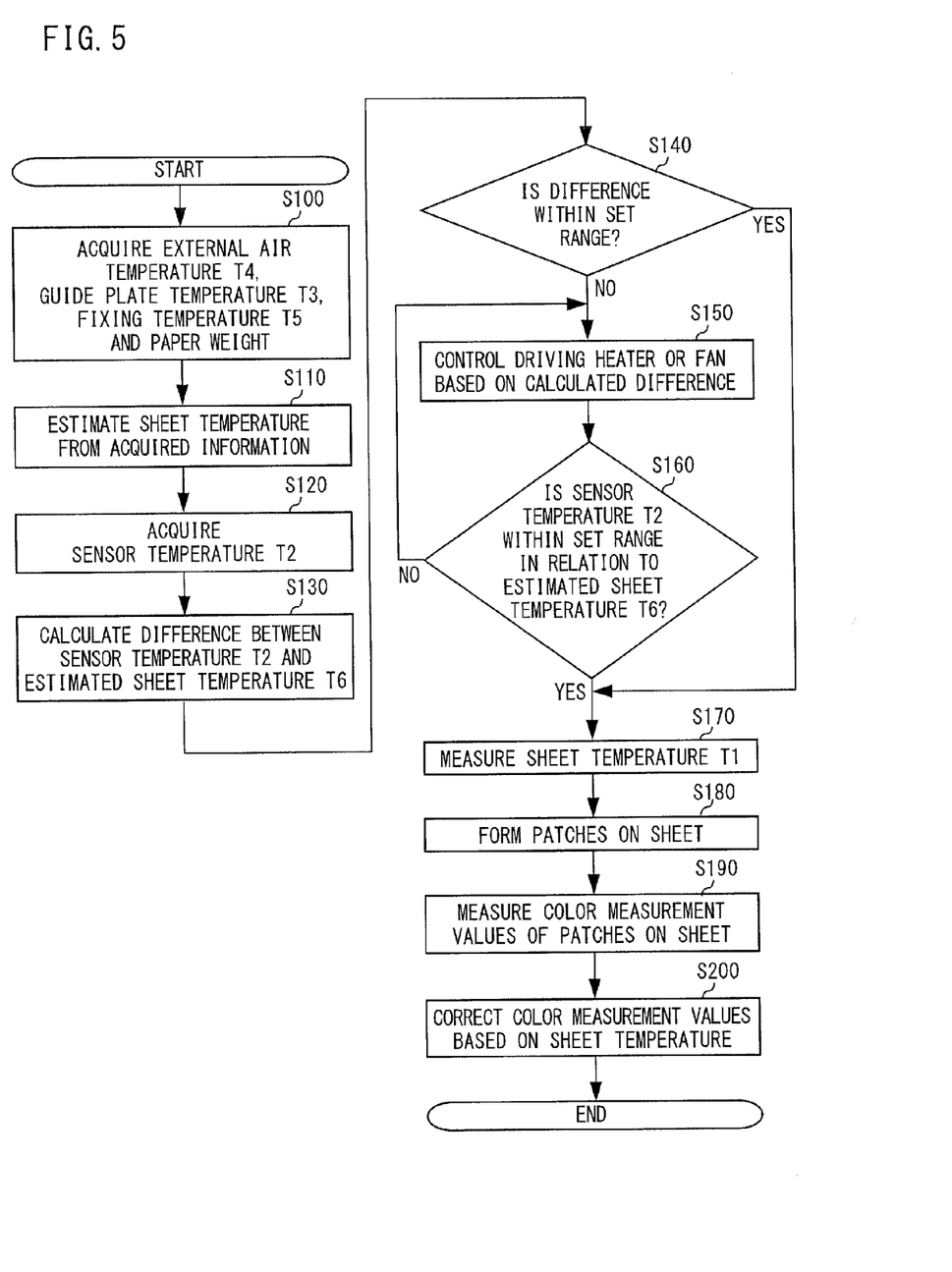
FIG. 5 is a flowchart showing an operation example of the image-forming apparatus when the image-forming apparatus performs temperature adjustment control and image-stabilizing control.

FIG. 5 shows an operation example of the image-forming apparatus 100 according to the embodiment of this invention when the image-forming apparatus performs temperature adjustment control and image-stabilizing control. The control portion 50 of the image-forming apparatus 100 carries out any program read out of the memory such as ROM 54 or the like and conducts any operating sequence shown in FIG. 5. In this embodiment, since the image-stabilizing control is performed, for example, when the power is switched on at a stating time or for every predetermined printed sheets, the control portion 50 carries out the temperature adjustment control before this image-stabilizing control is performed.

As shown in FIG. 5, at a step, S100, when starting the temperature adjustment control, the control portion 50 acquires the guide plate temperature T3 from the guide plate temperature detection sensor 140, acquires the external air temperature T4 from the external air temperature detection sensor 150, acquires the fixing temperature T5 from the fixing temperature detection sensor 160 and acquires the paper weight Ptype of the sheet P on which the image is formed from the computer 200 or the manipulation/display portion 70. When the step, S100 finishes, the control portion 50 goes to a step, S110.

At the step, S110, the control portion 50 calculates the estimated sheet temperature T6 of the sheet P, which has been heated by the fixing portion 44, based on the acquired guide plate temperature T3 and the like. For example, the control portion 50 calculates the estimated sheet temperature T6 by substituting the information on the acquired guide plate temperature T3 and the like for a following formula (1).

$$T6 = Ka*T4 + Kb*T5 + Kg*T3 + Kp*Ptype \qquad (1)$$

where T4 indicates the external air temperature, T5 indicates the fixing temperature, T3 indicates the guide plate temperature, Ptype indicates the paper weight and Ka, Kb, Kg and Kp indicate weighting coefficients. These weighting coefficients can be obtained by measuring the guide plate temperature T3 and the like and the real sheet temperature T1 by experiments and taking into consideration the relationship in the temperatures as shown in FIG. 4. When the step, S110 finishes, the control portion 50 goes to a step, S120.

At the step, S120, the control portion 50 acquires the sensor temperature T2 of the thermopile sensor 110, measured by the temperature sensor 112. When the step, S120 finishes, the control portion 50 goes to a step, S130.

At the step, S130, the control portion 50 calculates a difference between the sensor temperature T2 of the thermopile sensor 110 and the estimated sheet temperature T6 of the sheet P. When the step, S130 finishes, the control portion 50 goes to a step, S140.

At the step, S140, the control portion 50 determines whether or not the calculated difference is within a previously set range. The set range is, for example, a range of ±10 degrees C. When the control portion 50 determines that the calculated difference is within the previously set range, the control portion 50 determines that any temperature adjustment control of the thermopile sensor 110 is unnecessary because the sensor temperature T2 of the thermopile sensor 110 is close or almost equal to the estimated sheet temperature T6 of the sheet P thus calculated and goes to a step, S170. On the other hand, when the control portion 50 determines that the calculated difference is not within the previously set range, the control portion 50 determines that any temperature adjustment control of the thermopile sensor 110 is necessary because there is a certain temperature difference between the sensor temperature T2 of the thermopile sensor 110 and the estimated sheet temperature T6 of the sheet P thus calculated and goes to a step, S150.

At the step, S150, the control portion 50 controls the fan 120 or the heater 122 to drive on the basis of the calculated difference so that the sensor temperature T2 of the thermopile sensor 110 approaches the estimated sheet temperature T6, namely, the sensor temperature T2 falls within the set range in relation to the estimated sheet temperature T6. For example, when the sensor temperature T2 of the thermopile sensor 110 is lower than the estimated sheet temperature T6, the control portion 50 controls the heater 122 to heat the thermopile sensor 110. Alternatively, when the sensor temperature T2 of the thermopile sensor 110 is higher than the estimated sheet temperature T6, the control portion 50 controls the fan 120 to cool the thermopile sensor 110. When the step, S150 finishes, the control portion 50 goes to a step, S160.

At the step, S160, the control portion 50 determines whether or not the sensor temperature T2 of the thermopile sensor 110 falls within the previously set range in relation to the estimated sheet temperature T6 of the sheet P. This set range is, for example, a range of ±10 degrees C. When the control portion 50 determines that the sensor temperature T2 of the thermopile sensor 110 does not fall within the previously set range from the estimated sheet temperature T6 of the sheet P, the control portion 50 goes back to the step, S150 where the control portion 50 continues to control the fan 120 or the heater 122 to drive until the sensor temperature T2 falls within the previously set range.

On the other hand, when the control portion 50 determines that the sensor temperature T2 of the thermopile sensor 110 falls within the previously set range in relation to the estimated sheet temperature T6 of the sheet P, the control portion 50 goes to the step, S170. At the step, S170, the thermopile sensor 110 measures the sheet temperature T1 of the sheet P heated by the fixing portion 44 under the control of the control portion 50. This enables the temperature of the sheet P to be measured with the temperature of the thermopile sensor 110 approaches the estimated sheet temperature T6, thereby allowing any measurement errors to be decreased even when the species of sheet is different. When the step, S170 finishes, the control portion 50 goes to a step, S180.

At the step, S180, the control portion 50 controls the image-forming portion 10 and the like to form the patches for image adjustment on the sheet P. The fixing portion 44 fixes the patches for image adjustment formed on the sheet P. It is to be noted that the order of the steps, S170 and S180 may be reversed. In other words, after the patches for image adjustment are formed on the sheet P, this sheet P is fixed and then, the thermopile sensor 110 may measure the sheet temperature T1 of the fixed sheet P. In this case, the measured sheet temperature T1 can be fed back to the color measurement values, which will be described later, in real time.

At a step, S190, the color sensor 130 measures colors of the patches for image adjustment on the conveying sheet P to obtain their color measurement values. At a step, S200, the control portion 50 corrects the color measurement values obtained by the color sensor 130 based on the sheet temperature T1 of the sheet P measured by the thermopile sensor 110. Specifically, a look-up table in which the sheet temperature corresponds to the color measurement value (L*a*b) of the reference patch at this temperature is previously prepared. For example, color measurement values of the patches at two temperature points, 25 degrees C. and 40 degrees C., in the sheet temperature are stored in the look-up table. It is to be noted that 25 degrees C. is a reference temperature of color measurement value. When the sheet temperature T1 measured by the thermopile sensor 110 is, for example, 35 degrees C., the control portion 50 refers to the look-up table to acquire the color measurement values at 25 degrees C., which is reference temperature (corrects the color measurement values at 35 degrees C.). Thus, this embodiment can suppress the thermochromism phenomenon caused by the sheet temperature and can realize a high-precision color matching and color stability. Of course, the correction method is not limited to the above-mentioned correction method but other known technology may be also used.

The control portion 50 next corrects any image-forming conditions such as an exposure value, development bias and the like based on the corrected color measurement values and control the image-forming portion 10 and the like based on the corrected image-forming conditions to form a desired image on the sheet P.

As described above, according to this embodiment, since the temperature control such that the sensor temperature T2 of the thermopile temperature 110 approaches the estimated sheet temperature T6 of the sheet P is performed, it is possible to suppress any influence of thermal radiation to the thermopile sensor 110 based on the difference in the species of the sheets to its minimum limit. This eliminates any necessary for correction of radiation for every sheet, so that even when the species of sheet is increased, it is possible to accurately and easily measure the temperature of the sheet P. As a result thereof, since the temperature of the sheet P can be acquired in the precision required for any correction of the thermochromism phenomenon, it is possible to realize the image-stabilizing control with higher precision.

Further, according to this embodiment, since the temperature of the conveying sheet P is estimated using each piece of the information on the guide plate temperature T3, the external air temperature T4, the fixing temperature T5 and the paper weight Ptype of the sheet P, it is possible to accurately calculate the estimated sheet temperature T6 with high precision.

Additionally, according to this embodiment, since the temperature of the thermopile sensor 110 is adjusted using the fan 120 or the heater 122, it is possible to rapidly and effectively adjust the temperature of the thermopile sensor 110. Since the fan 120 and the like are included in the case 114, it is possible to very effectively adjust the temperature of the thermopile sensor 110. The fan 120 and the heater 122 can be selectively settled according to any environment of the apparatus or set temperature of each component. For example, when approaching the sensor temperature T2 of the thermopile sensor 110 to the estimated sheet temperature T6, only the heater 122 may be settled if in many cases, heating is carried out while only the fan may be settled if in many cases, cooling is carried out.

The terms and expressions which have been employed in the foregoing description are used therein as terms of description and not of limitation, and these are no intention, in the use of such terms and expressions, of excluding equivalent of the features shown and described or portions thereof, it being recognized that the scope of the invention is defined and limited only by the claims.

It is to be noted that any technical scope of the claims and/or meaning of term(s) claimed in the claims are not limited to the description in the above-mentioned embodiments. It should be understood by those skilled in the art that various modifications, combinations, sub-combinations and alterations may occur depending on design requirements and other factors insofar as they are within the scope of the appended claims or the equivalents thereof. Although a case where the temperature control such that the sensor temperature T2 of the thermopile temperature 110 approaches the estimated sheet temperature T6 of the sheet P is applied to the image-forming apparatus 100 has been described, this invention is not limited thereto. This invention is also applicable to a temperature measuring device 300 (see FIG. 3) containing a control portion 50, a thermopile sensor 110, which is a radiation temperature sensor, that measures temperature of a sheet by a contactless state, a temperature sensor 112 that measures temperature of the thermopile sensor 110, a fan 120 or a heater 122, which is a temperature adjustment portion, that adjusts temperature of the thermopile sensor 110, a guide plate temperature detection sensor 140, an external air temperature detection sensor 150, a fixing temperature detection sensor 160 and the like.

The control portion 50 estimates the temperature of the sheet based on an image-forming condition when forming the image, as described above. The control portion 50 also controls the temperature adjustment portion so that the temperature of the thermopile sensor 110 measured by the temperature sensor 112 approaches the estimated temperature of the sheet. The control portion acquires the temperature of the sheet measured by the thermopile sensor 110 when the temperature of the thermopile sensor 110 is within a predetermined range thereof in relation to the estimated temperature of the sheet. The temperature measuring device 300 may be provided in an apparatus, for example, a post-processing apparatus, which is connected at a downstream side of the image-forming apparatus 100 along the sheet conveying direction D. In this case, the control portion 50 acquires the sheet temperature T1 after the temperature adjustment control and feeds it back to the color measurement values, thereby correcting any shifts in the color measurement values based on the temperature variation. The color sensor 130 may be provided at a downstream side of the thermopile sensor 110 along the sheet conveying direction D or at an upstream side of the thermopile sensor 110, for example, inside the image-forming apparatus 100, along the sheet conveying direction D. The temperature measuring device 300 is suitably applicable to an apparatus which is required to have a function to measure the accurate temperature of the sheet, other than the post-processing apparatus.

The calculation method of the estimated sheet temperature T6 of the sheet P is not limited to the one described in the above-mentioned embodiment. For example, the estimated sheet temperature T6 of the sheet P can be calculated using at least one piece of the information on the guide plate temperature T3, the external air temperature T4, the fixing temperature T5 and the paper weight Ptype of the sheet P, not all of pieces of the information on them. The estimated sheet temperature T6 of the sheet P can be calculated using a formula other than the formula (1), a program or the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image-forming apparatus comprising:
   an image-forming portion that forms an image adjustment patch on a sheet;
   a fixing portion that fixes the image adjustment patch;
   a color sensor that acquires a color measurement value of the image adjustment patch;
   a radiation temperature sensor that contactlessly measures a temperature of the sheet;
   a temperature sensor that measures a temperature of the radiation temperature sensor;
   a temperature adjustment portion that adjusts the temperature of the radiation temperature sensor; and
   a control portion that:
      estimates the temperature of the sheet based on an image-forming condition, and
      controls the temperature adjustment portion so that the temperature of the radiation temperature sensor approaches the estimated temperature of the sheet,
   wherein the control portion:
      acquires the temperature of the sheet when the temperature of the radiation temperature sensor is within a predetermined range in relation to the estimated temperature of the sheet, and
      corrects the color measurement value based on the acquired temperature of the sheet.

2. The image-forming apparatus according to claim 1 wherein the image-forming conditions comprises an external air temperature, a temperature of the fixing portion, a temperature of a guide plate that guides the sheet to a conveying direction of the sheet and paper weight of the sheet.

3. The image-forming apparatus according to claim 2 wherein the temperature adjustment portion comprises a fan and a heater.

4. The image-forming apparatus according to claim 1 wherein the temperature adjustment portion comprises a fan and a heater.

5. A temperature-measuring device comprising:
   a radiation temperature sensor that contactlessly measures a temperature of a sheet;
   a temperature sensor that measures a temperature of the radiation temperature sensor;
   a temperature adjustment portion that adjusts the temperature of the radiation temperature sensor; and
   a control portion that:
      estimates the temperature of the sheet based on an image-forming condition when forming the image, and
      controls the temperature adjustment portion so that the temperature of the radiation temperature sensor approaches the estimated temperature of the sheet,
   wherein the control portion acquires the temperature of the sheet when the temperature of the radiation temperature sensor is within a predetermined range in relation to the estimated temperature of the sheet.

* * * * *